United States Patent [19]

Yajima et al.

[11] 4,268,164
[45] May 19, 1981

[54] COMPOSITE INFORMATION RECORDING APPARATUS AND ORIGINAL POSITION DESIGNATING MECHANISM THEREFOR

[75] Inventors: Tatsuo Yajima; Hiroya Nakamura, both of Hino, Japan

[73] Assignee: Konishiroku Photo Industry Co., Ltd., Tokyo, Japan

[21] Appl. No.: 51,965

[22] Filed: Jun. 25, 1979

[30] Foreign Application Priority Data

Jun. 26, 1978 [JP] Japan ................................. 53/77259

[51] Int. Cl.³ .......................................... G03B 27/52
[52] U.S. Cl. ....................................... 355/41; 355/7; 355/51
[58] Field of Search ............................ 355/7, 40–45, 355/50, 51

[56] References Cited

U.S. PATENT DOCUMENTS

| | | | |
|---|---|---|---|
| 3,537,788 | 11/1970 | Young | 355/40 |
| 3,819,264 | 6/1974 | Voorhees | 355/43 |
| 3,907,424 | 9/1975 | Komori et al. | 355/51 X |

*Primary Examiner*—Richard A. Wintercorn
*Attorney, Agent, or Firm*—Bierman & Bierman

[57] ABSTRACT

An apparatus for the recording of composite information from an original to be photocopied and a source of external information includes a position designating mechanism for indicating and distinguishing the portion of the original document to be copied from the portion to be omitted and into which position information from the external source is to be inserted.

9 Claims, 9 Drawing Figures

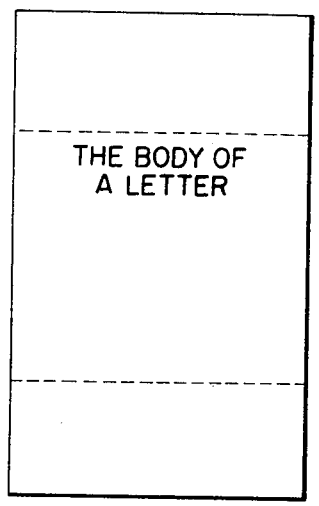
FIG. 1a
ORIGINAL
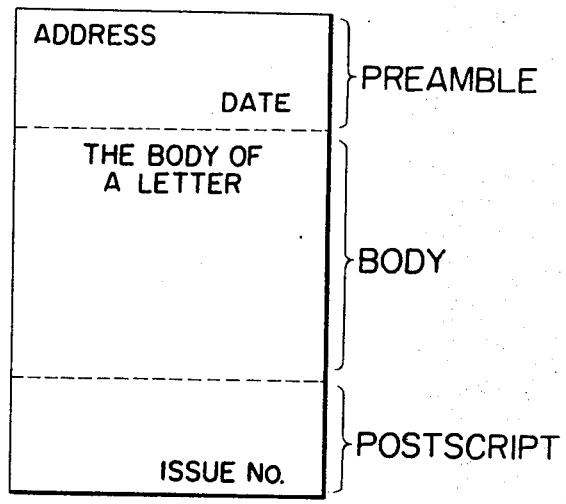
FIG. 1b
RECORDING
FIG. 2
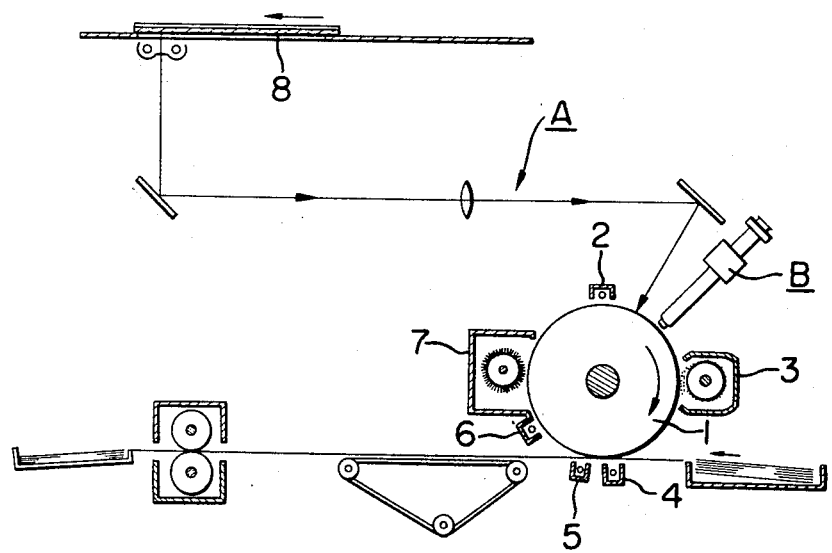

COMPOSITE INFORMATION RECORDING APPARATUS AND ORIGINAL POSITION DESIGNATING MECHANISM THEREFOR

BACKGROUND OF THE INVENTION

Field of the Invention

The present invention relates in general to a composite information recording apparatus for recording contents of an original to be copied in combination with information supplied from an external information source in a composite manner. More specifically, the invention concerns an original position designating apparatus for producing a signal representing the position of the original to be copied.

In general, in the recording of images in a composite manner, there may arise a case where a plurality of recordings containing the identical body of a letter such as shown in FIG. 1(a) together with different preambles (addresses or the like) and postscripts (issue numbers or the like) such as shown in FIG. 1(b) are desired with the information to be recorded in the preamble and the postscript being supplied from an external information or data source. In this case, a composite information recording apparatus such as shown in FIG. 2 can be made use of. Referring to FIG. 2, the composite information recording apparatus comprises an electric charging device 2, a developing device 3, an image transfer electrode 4, a separating electrode 5, a charge removing or neutralizing electrode 6 and a cleaning device 7 which are disposed around a light sensitive peripheral surface of a rotatable drum 1 which is commonly referred to as the light sensitive drum. Additionally, the recording apparatus includes an exposure or irradiation optical system A for projecting an image of an original carried by a copy board 8 onto the peripheral surface of the light sensitive drum 1 and a scanning-/reproducing means B for impressing an information signal available from an external information source onto the peripheral surface of the light sensitive drum 1 through scanning operation. The scanning/reproducing means B may be constituted by an optical fiber tube (OFT), a thin window recording tube (TWT), a laser beam scanner or the like, for example. In order to produce a composite recording such as shown in FIG. 1(b) with the aid of the composite information recording apparatus outlined above, the portions of the original corresponding to the preamble and the postscript are covered by black cover papers or the like and disposed on the copy board so as to allow the writing irradiation through the scanning/reproducing means to be effected on the drum surface at locations corresponding to the preamble and the postscript. The time for initiating the recording by the scanning/reproducing means B as well as the time for terminating the recording are preset in an appropriate manner. Subsequently, the copying operation of the original is carried out with the preamble and postscript information being concurrently supplied from an external information source such as a memory equipment or the like to the scanning/reproducing means. The composite recording operation requires not only troublesome work in inserting and locating properly the black cover sheets but also a specific device for setting the timings for the input operation of the external information in addition to the timings for the movement of the copy board.

SUMMARY OF THE INVENTION

The present invention is contemplated to facilitate the procedure for preparing the composite recording by means of the composite information recording apparatus. Accordingly, a primary object of the invention is to provide a composite information recording apparatus which permits only a concerned portion of an original to be copied without need to cover the unnecessary portion of the original with a black cover sheet and which is provided with an original position designating mechanism capable of designating the position of the concerned portion of the original in a simplified manner. By the way, in the following description of preferred embodiments of the invention, it is assumed that a signal produced from a position detecting element is utilized for operating a shutter inserted in the exposure optical system. However, it will be self-explanatory that the detection output signal from the position detecting element may be utilized as a trigger signal for the external information to be reproduced by the scanning/reproducing means.

The above and other objects, novel features and advantages of the invention will become more apparent by examining the following description of the exemplary embodiments of the invention by referring to FIGS. 3 to 9 of the accompanying drawings.

BRIEF DESCRIPTION OF THE DRAWINGS

FIG. 1 is intended to illustrate the concept of composite information recording, FIG. 2 is a schematic view showing a general arrangement of a composite information recording apparatus.

DETAILED DESCRIPTION OF THE PREFERRED EMBODIMENTS

Figure 3:
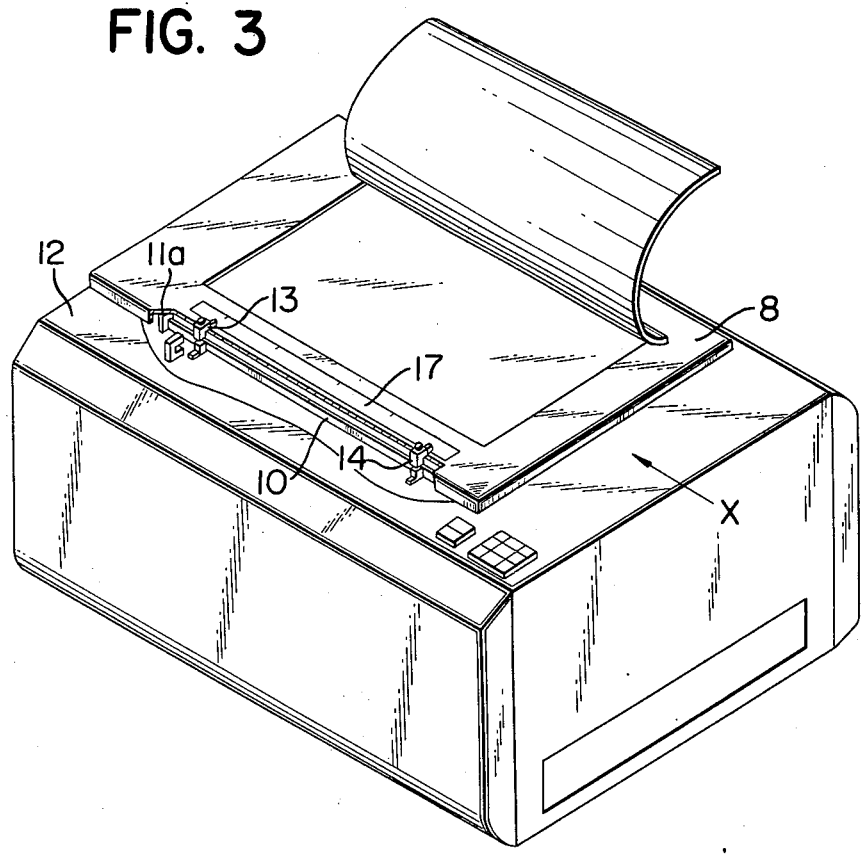
FIG. 3 is an overall perspective view showing an information composite recording apparatus according to a first embodiment of the invention with a portion being broken away.
Figure 4:
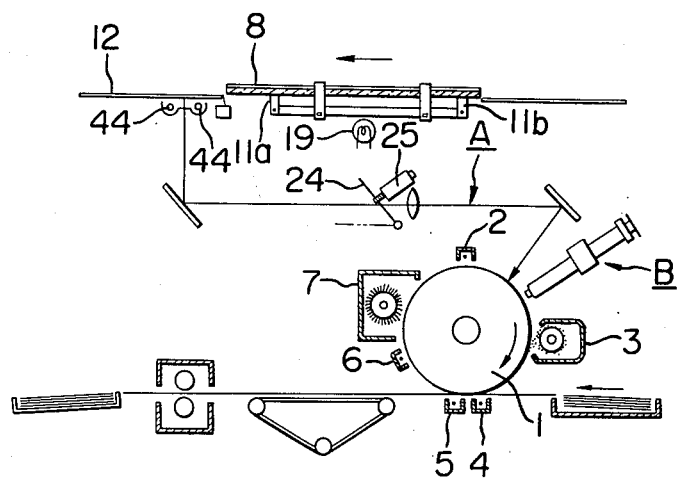
FIG. 4 is a schematic view illustrating a general arrangement of the same.
Figure 5:
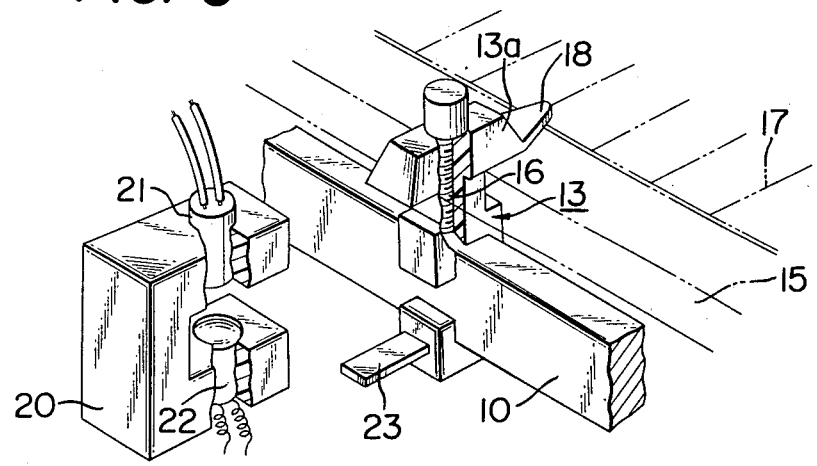
FIG. 5 is a fragmental enlarged view showing a main portion of the recording apparatus shown in FIG. 3.

FIGS. 3 to 5 show a composite information recording apparatus to which the teaching of the invention is applied. In FIG. 4, the same components as those shown in FIG. 2 are indicated by the same reference numerals. Repeated description of these components will be unnecessary.

Referring to FIGS. 3 to 5, an original position designating mechanism according to an embodiment of the invention comprises a guide 10 fixedly mounted on a movable copy board 8 at a lower side portion thereof. The guide 10 extends in the moving direction X of the copy board 8 and is supported by a pair of brackets 11a and 11b of the copy board 8 at both ends. Alternatively, the guide 10 may be mounted on a stationary portion of the recording apparatus such as a machine body 12. According to the invention, a pair of locating sliders (position designating sliders) 13 and 14 which are adapted to be slidably moved by a finger tip of an operator are mounted on the guide 10. Each of the sliders 13 and 14 is provided with a knob 13a which extends through a groove 15 formed in the copy board 8 outwardly so that the associated slider can be slidably moved by the operator through the knob 13a. Each of the sliders 13 and 14 has a clamping screw 16 threadedly inserted through the top of the knob 13a and fixedly mounted onto the guide 10. By means of this clamping screw 16, it is possible to prevent the sliders 13 and 14 from being unintentionally moved.

It will be understood that the sliders 13 and 14 are moved together with the copy board 8, when the board is moved in accordance with the recording operation.

A scale plate 17 is bonded on the copy board 8 along the guide 15. Through a combination of pointers 18 formed in the sliders 13 and 14 with the scale plate 17 having a scale representing the number of lines, it is possible to give the information concerning the number of lines contained in the original. An illuminating lamp 19 (FIG. 4) for irradiating the original carried on the copy board 8 is disposed within a black box of the exposure optical system of the composite information recording apparatus, whereby the body of the letter or original can be observed through the light rays transmitted through the original.

Fixedly mounted on the stationary portion of the apparatus along the moving path of the sliders 13 and 14 is a photoelectric converter block 20 of U-like configuration having legs in which a light emission diode 21 and a photo-transistor 22 are accommodated in opposition to each other so as to define a space therebetween which is adapted to be traversed by flaps 23 each affixed to the sliders 13 and 14. Of course, the position detecting means constituted by the photo-transistor 22 and the flap 23 may be replaced by a combination of a microswitch and an actuating cam, a combination of a reed switch and a permanent magnet, a combination of a magnetic field sensing coil and a permanent magnet, or a hydraulic pressure detector or the like. Further, a variable resistor or the like may be employed when the original position information is to be detected in the form of an electrical analog signal.

In the case of the embodiment described above, the detection output signal produced by the photo-transistor 22 is supplied to a driving circuit D1 (FIG. 9) for energizing a solenoid 25 which serves to actuate a shutter 24 interposed in the exposure optical system A so that the shutter 24 can be opened only when the body of the original is located at the position ready for exposure. In the foregoing description, the photoelectric converter block or the position detector element 20 is assumed to be mounted on a stationary fixture portion of the recording apparatus with the acting element (flap 23) therefor being mounted on the slider. However, such mounting relation may be inverted; i.e. the position detector block being mounted on the slider while the acting element is secured to the stationary portion of the recording apparatus. Further, in case the slider is disposed on the stationary portion of the recording apparatus, either one of the position detector or the acting element therefor may be mounted on the slider, while the other may be mounted on the copy board. The number of sliders employed may be varied as desired.

Figure 6:
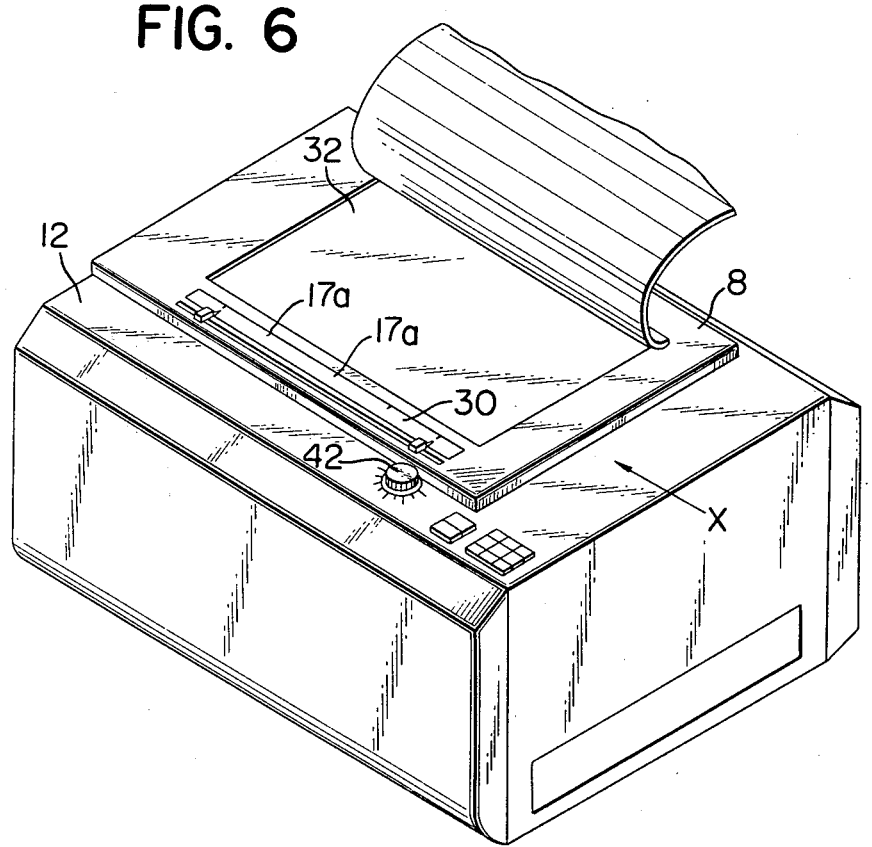
FIG. 6 is an overall perspective view of the composite information recording apparatus according to a second embodiment of the invention.
Figure 7:
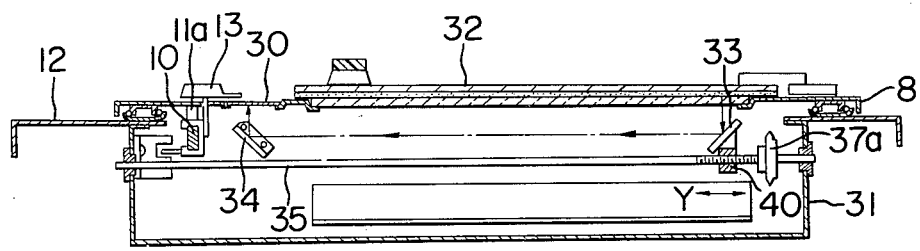
FIG. 7 is a side view of an original carriage with some parts being shown in section.
Figure 8:
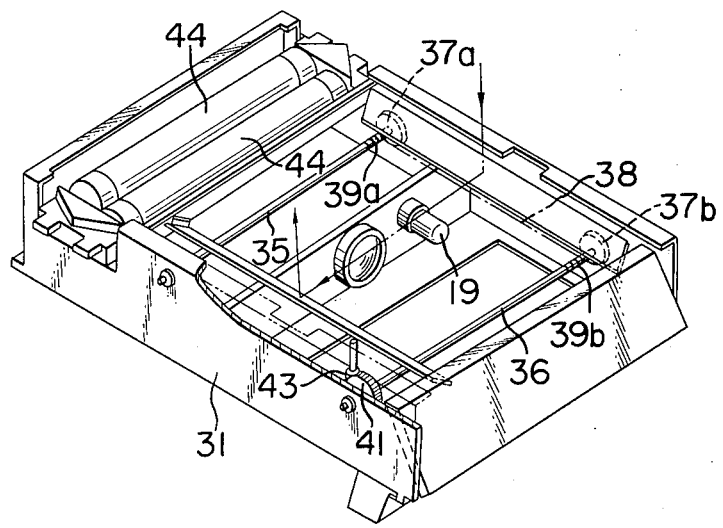
FIG. 8 is a perspective view of a black box for an exposure optical system and FIG. 9 is a block schematic diagram of a signal processing circuit in accordance with the invention.

Another embodiment of the invention is illustrated in FIGS. 6 to 8 in which the same components as those described above in conjunction with FIGS. 3 to 5 are denoted by the same reference numerals. A characteristic feature of the second embodiment shown in FIGS. 6 to 8 resides in that an image of the original on the copy board 8 can be observed through a confirming window 30 provided with a scale 17a representing the number of lines contained in the original. More specifically, a first mirror 33 which is swingable for 45° is installed within the black box 31 of the exposure optical system along a side edge of a glass plate 32 of the copy board 8. The light beam reflected from the first mirror 33 impinges on a second mirror 34 which is secured to the black box 31 of the exposure optical system at a position immediately below the confirming window 30. Since the second mirror 34 is arranged such that the incident light from the first mirror 33 is reflected toward the confirming window 30, each line or row of the original may be viewed through the confirming window 30.

A pair of supporting rods 35 and 36 extending in the direction perpendicular to the moving direction of the copy board 8 are rotatably mounted on the black box 31 for the exposure optical system and are adapted to be rotated in synchronism with each other through sprockets 37a and 37b and a chain 38. A right hand thread 39a and a left hand thread 39b are formed in the supporting rods 35 and 36, respectively. The first mirror 33 is mounted at both ends thereof on nuts 40 which are threadedly engaged with the thread portions 39a and 39b, respectively. A worm wheel 41 is fixedly mounted on the supporting rod 35 at one end thereof and is adapted to be meshed with a worm 43 (FIG. 8) formed integrally with an adjusting knob 42 (FIG. 6) located externally of the machine housing 12. In this manner, the operator can operate the adjusting knob 42 to displace the position of the first mirror in the direction indicated by an arrow Y, to thereby vary the portion of the original observed through the confirming window 30.

In the case of the embodiment described above, the confirming or checking window 30 is provided on the copy board. However, it is possible to provide the confirming window 30 at the machine housing. Further, the illuminating lamp 19 may be omitted with the lamp 44 for exposure being used also as the illuminating light source.

Figure 9:
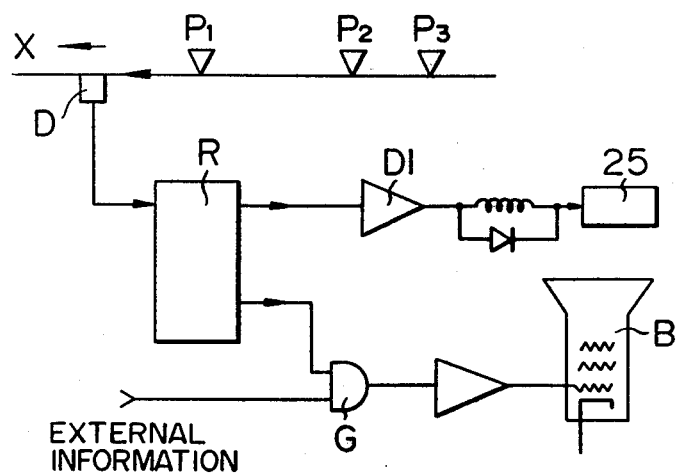

FIG. 9 shows a block schematic diagram of the signal processing circuit of the position designating mechanism according to the invention. Reference numerals $P_1$, $P_2$, and $P_3$ represent locations of the position detecting means along the axis of motion of the copy board 8. The output signal of the position detector 20 (here designated D) is supplied to a control circuit R, which controls substantially simultaneous change-over of the source of information optically fed onto the surface of the drum from either the optical system A or the scanning/reproducing means B. A conventional microcomputer may be utilized in implementing the control circuit R. One of the two outputs of the control circuit R is operatively connected to solenoid 25 of shutter 24 through driver D1, while the other output is connected to a gate G for enabling the supply of external information to the scanning/ reproducing means B through the gate G.

As will be appreciated from the foregoing description, the composite information recording apparatus according to the invention is capable of producing a recording which contains the contents of the original on the copy board and external information supplied to the scanning/reproducing means in a composite manner merely by setting the positions of the sliders. Thus, procedure for the composite information recording can be much simplified as compared with conventional composite recording apparatus. Further, the setting of the sliders can be effected while observing the number of lines or rows on the original with the aid of the original position designating mechanism according to the invention in a much facilitated manner. Additionally, by virtue of the provision of the confirming or checking window, a composite recording of a high quality in which the line heads are aligned with one another can be attained.

What we claim is:

1. A composite information recording apparatus in which an optical system projects the image of an original positioned on a slidable copy board onto a moving photosensitive surface, the improvement comprising:
    a slidable means mounted adjacent said copy board for selectively delineating the beginning and end of that portion of the original to be copied;
    means projecting a secondary source of information onto said photosensitive surface;
    means normally interrupting the projection of the image of the original along the path of said optical system; and
    means operated by said slidable means for actuating said interrupting means to enable projection of the image of the original along the path of the optical system and substantially simultaneously deenergize said secondary source of information at the beginning of that portion of the original to be copied, and actuating said interrupting means to interrupt the projection of the image of the original along the path of the optical system and substantially simultaneously energize said secondary source of information at the end of that portion of the original to be copied.

2. A composite information recording apparatus according to claim 1, wherein said actuating means includes means for detecting said slidable means during operative sliding movement of the copy board, at least one of said detecting means and said slidable means being relatively movable with the copy board with respect to the other.

3. A composite information recording apparatus according to claim 2, said slidable means including flap means extending therefrom and said detecting means including photoelectric means for producing an output in response to detection of said flap means during relative movement of said slidable means and said detecting means.

4. A composite information recording apparatus according to claim 1, further comprising guide means on the copy board and disposed so as to lie along an edge of the original positioned thereon.

5. A composite information recording apparatus according to claim 4, said slidable means being selectively movable along said guide means for delineating the beginning and end of that portion of the original to be copied.

6. A composite information recording apparatus according to claim 1, said secondary information projecting means being an optical fiber tube.

7. A composite information recording apparatus according to claim 1, said interrupting means comprising a shutter means interposed in the path of the optical system and actuatable by said means operated by the slidable means to control the projection of the image of the original along said path.

8. In a composite information recording apparatus including a movable copy board for supporting an original to be copied and an optical system, an original position designating mechanism for preparing a composite recording containing contents of the original and external input information, said position designating mechanism comprising:
    a window extending in the direction of movement of the copy board and through which at least a portion of the original supported on the copy board may be viewed;
    a mirror adapted to reflect the image of the original toward the window for viewing therethrough;
    position designating means adapted to be slidably moved along a side edge of the copy board and fixed at a selected position therealong for selectively delineating a boundary image area of the original within which the contents of the original to be recorded are located;
    means for detecting the selected position of the designating means so as to detect the boundary image area of the original; and
    a shutter operatively responsive to detection by said detecting means of the selected position of said designating means for preventing recording of portions of the original not within said boundary image area.

9. An original position designating mechanism according to claim 8 and further comprising a scale on the copy board representing the number of lines on the original for facilitating selective delineation of said boundary image area of the original.

* * * * *